United States Patent [19]

Morgan, Jr.

[11] Patent Number: 5,137,632
[45] Date of Patent: Aug. 11, 1992

[54] OPTIONAL SELF-RETAINING FILTER BAG

[76] Inventor: Howard W. Morgan, Jr., 100 Anchor Rd., P.O. Box 735, Michigan City, Ind. 46360

[21] Appl. No.: 743,672

[22] Filed: Aug. 12, 1991

Related U.S. Application Data

[63] Continuation of Ser. No. 417,062, Oct. 4, 1989, abandoned.

[51] Int. Cl.⁵ .............................................. B01D 27/08
[52] U.S. Cl. ..................................... 210/445; 210/450; 210/452; 210/453; 210/455; 210/474; 210/477
[58] Field of Search ............... 210/445, 450, 451, 452, 210/453, 455, 474, 477, 484, 497.01

[56] References Cited

U.S. PATENT DOCUMENTS

| | | | |
|---|---|---|---|
| 3,592,768 | 7/1971 | Parker | 210/445 |
| 3,640,392 | 2/1972 | Smith et al. | 210/445 |
| 4,204,966 | 5/1980 | Morgan, Jr. | 210/455 |
| 4,259,188 | 3/1981 | Morgan | 210/451 |
| 4,285,814 | 8/1981 | Morgan, Jr. | 210/452 |
| 4,419,240 | 12/1983 | Rosaen | 210/452 |
| 4,442,003 | 4/1984 | Holt | 20/445 |
| 4,490,253 | 12/1984 | Tafara | 210/452 |

Primary Examiner—Robert A. Dawson
Assistant Examiner—Wanda L. Millard
Attorney, Agent, or Firm—James D. Hall

[57] ABSTRACT

A filter bag which is for use in a liquid filter and which includes a liquid impervious shape-retaining edge portion defining the opening into the filter bag. The edge portion includes an annular inverted V-shaped part which terminates in an annular upturned lip part. The inverted V-shaped part of the filter bag edge portion allows the bag to be placed over a protruding upwardly directed lip in the filter housing while, optionally, the upturned lip part of the bag's edge portion permits the bag to be fitted into the filter housing with the lip part being restrictively fitted between a shoulder or support and an overlying lip formed in the filter housing. Further, the upturned lip part of the filter bag can be wedged into a filter housing to secure the bag independently of the filter top.

6 Claims, 2 Drawing Sheets

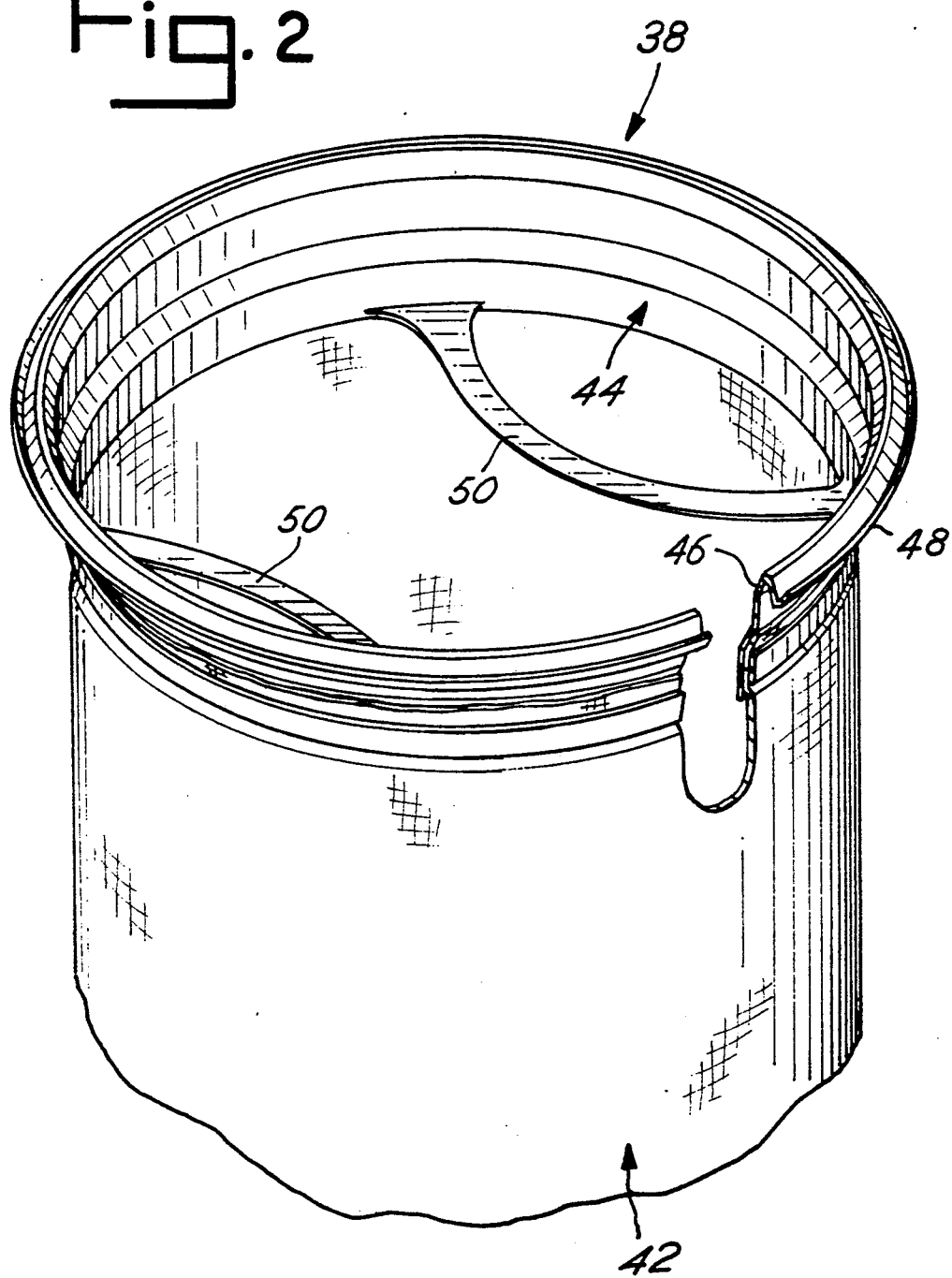

OPTIONAL SELF-RETAINING FILTER BAG

This is a continuation application Ser. No. 417,062, filed on Oct. 4, 1989, now abandoned.

BACKGROUND OF THE INVENTION

This invention relates to a liquid filter and will have particular application to the construction and manner of operation of the filter bag utilized within the filter.

Heretofore, filter bags with liquid impervious shape-retaining edge portions, serving to define the opening end of the bag, have been of specific construction depending upon the particular manner in which the bag is seated within the filter housing. For example, in U.S. Pat. Nos. 4,133,769, the bag is formed with an out-turned flange which is restrictively fitted between a support or shoulder and a lip of the filter so as to form a self-retaining filter bag. In U.S. Pat. No. 4,259,188 the filter bag is formed with an inverted V-shaped edge portion at its opening which is adapted to be fitted over a vertically extending lip or rim and compressed therebetween by the filter cap or top.

SUMMARY OF THE INVENTION

In the subject invention, the filter bag is designed at its shape-retaining edge portion with an inverted V-shaped part which terminates in an upwardly extending lip. Through this combination of components, the bag may be optionally used either as a self-retaining bag by having its upwardly extending lip restrictively fitted between a filter housing lip and support, wedge fitted into a housing having no lip, or as being fitted within the filter housing over an upwardly protruding lip or rim which fits into the inverted V-shaped part of the bag edge portion. In this manner, a uniquely shaped filter bag is produced allowing optional use in the manner of its retention within the filter housing.

accordingly, it is an object of this invention to provide a liquid filter having a filter bag which may be retained within the filter housing in more than one optional manner.

It is another object of this invention to provide a filter having a filter bag with a shape-retaining edge portion which defines the opening into the bag and which includes an upwardly directed annular lip allowing the bag to be restrictively fitted within the filter housing.

It is another object of this invention to provide a filter bag having a shape-retaining edge portion which forms the opening into the bag and which permits the bag to be retained within the filter housing in a multiple of optionally selectable ways.

And still another object of this invention is to provide for a liquid filter bag which is of economical construction and of multiple use.

Other objects of this invention will become apparent upon a reading of the following description.

BRIEF DESCRIPTION OF THE DRAWINGS

A preferred embodiment of this invention has been chosen for purposes of illustration and description wherein:

FIG. 2 is a fragmentary perspective view of the filter bag with portions of the bag removed for illustrative purposes.

DESCRIPTION OF THE PREFERRED EMBODIMENT

Figure 1:
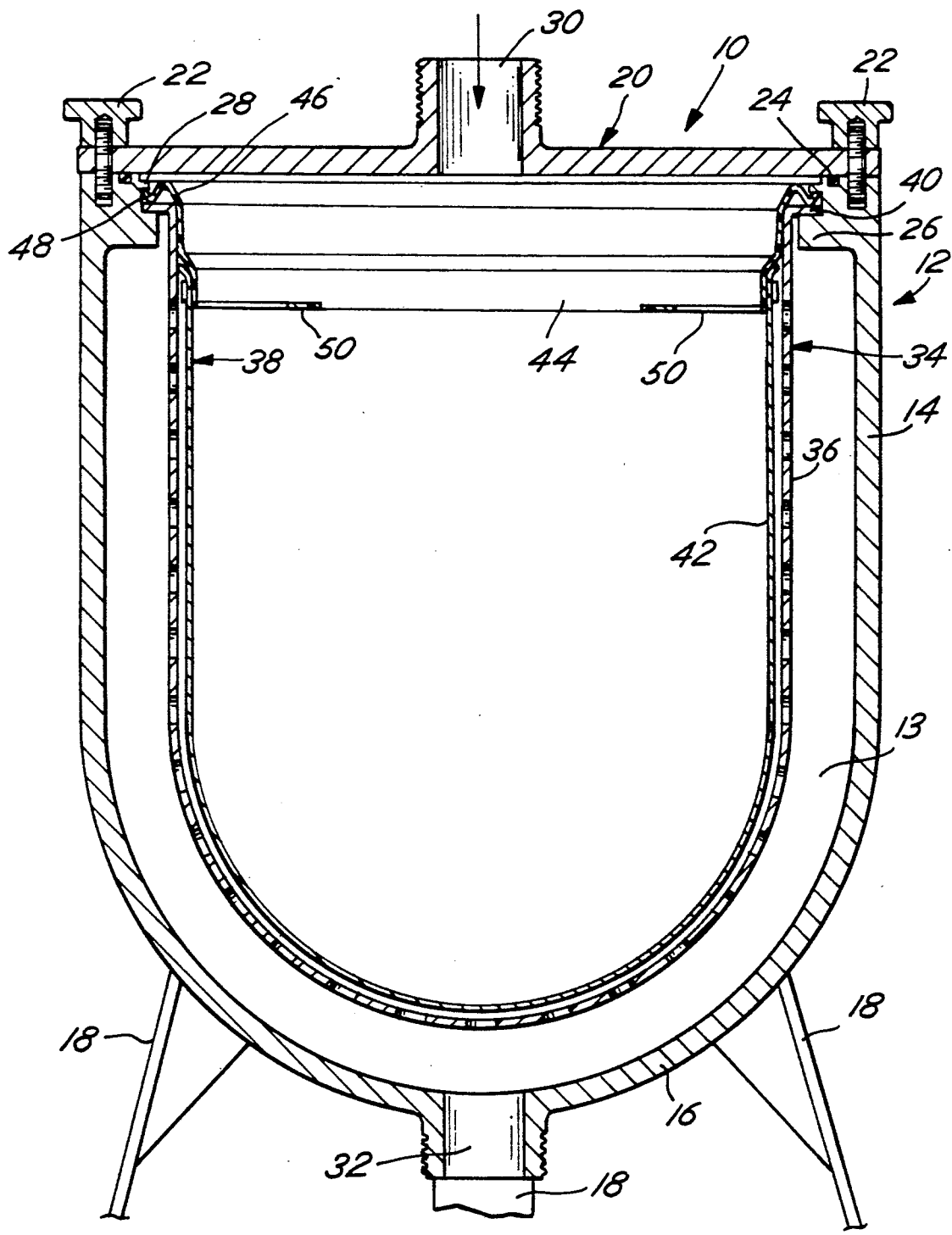
FIG. 1 is a cross-sectional view of a filter housing illustrating the use of the filter bag.

Filter 10 illustrated in sectionalized form in FIG. 1 includes a housing 12 formed by an annular side wall 14 and a concave bottom wall 16. Legs 18 extend outwardly from housing 12 and are utilized to support the housing upon a floor. The upper open end of housing 12 is spanned by a top or cap 20. Cap 20 is secured to housing 12 by removable threaded hold-down member 22. An O-ring seal 24 is compressed between the cap and housing to form a liquid tight seal.

An annular shoulder or support 26 is formed in the upper margin of housing side wall 14 about the opening into the housing. Located adjacently but spacedly above support 26 is an inwardly protruding annular lip 28 forming a part of the housing side wall 14. Filter 10 includes an inlet port and an outlet port which, in the described embodiment, are designated as inlet port 30 formed in cap 20 and outlet port 32 formed in bottom wall 16 of housing 12.

Seated within housing 12 is a basket 34 having a reticulated wall 36. The purpose of basket 34 is to support a filter bag 38 and thus the basket is formed of a rigid shape-retaining construction. An out-turned annular flange 40 is formed at the opening into basket 34 with the outer diameter of the basket flange exceeding the inner diameter of housing support 26 so as to enable the basket to be supported within the housing by having its flange 40 overlying and resting upon the support. As thus far described, filter 10 is of the form and type described in U.S. Pat. No. 4,133, 769.

Filter bag 38 includes a wall part 42 which is formed of a flexible, liquid pervious material, such as interwoven nylon, cotton or wool, and a ring 44 which is formed of a flexible shaped-retaining material such as nylon or polypropylene. Bag ring 44 forms the opening defining edge portion into the bag and is attached to wall part 42, such as by sewing or heat sealing. Ring 44 includes an annular inverted V-shaped part 46 which terminates in an annular upturned lip part 48. The upturned lip 46 forms an acute angle relative to the annular inverted V-shaped part 46.

The outermost diameter of filter bag 38 as measured across lip part 48 exceeds the innermost diameter of housing lip 28. In this manner, after the basket 34 has been inserted into the chamber 13 formed by housing 12 with its flange 40 seated upon support 26 of the housing, filter bag 38 is inserted into the basket and forced downwardly with its lip part 48 initially contacting the upper edge of housing lip 28 and being flexed inwardly over the lip and then snap-fitted outwardly under the lip over support 26 so as to be self-retained within the filter housing. In the illustrated embodiment, when basket 34 is utilized with the filter, the outer, lowermost edge of inverted V-shaped part 46 of the bag ring rests upon flange 40 of the basket. It is to be understood that in some uses of filter bag 38, a basket 34 will not nor need not be utilized with the filter housing to provide support for the bag. Also the filter bag can be wedge fitted into the filter housing with lip part 48 restrictively pressed against the side wall of the housing. Filter bag 38, in the described embodiment, is provided with handles 50 which enable the bag to be more easily removed from the filter housing when it is time to replace the bag.

In some uses of filter bag 38, a filter housing having an upwardly protruding annular lip such as shown in U.S. Pat. No. 4,259,188 may be utilized to accommodate the bag. In this construction the bag is fitted so that the upwardly protruding lip fits into the inverted V-shaped part 46 to support the bag within the filter housing as generally shown in the aforementioned patent.

It is to be understood that the invention is not to be limited to the details above given but may be modified in accordance with the following claims.

What I claim is:

1. A liquid filter comprising a housing defining a chamber therein, said housing having an upper opening into its chamber, a top spanning said housing opening, said housing including an annular support extending about the housing within said chamber, inlet and outlet ports located in liquid flow communication through said annular support, a filter bag for filtering liquid having an opening defined by a flexible shape-retaining edge portion, said bag opening edge portion being liquid impervious and having an annular V-shaped part terminating in an annular upturned lip part, at least part of said lip part extending at an acute angle relative to said V-shaped part, said housing including a lip spacedly located above said support, said bag fitted within said chamber and having its lip part located between said housing support and housing lip.

2. The liquid filter of claim 1 and a reticulated basket having an opening therein, said basket fitted within said chamber and contacting said housing support about the housing opening, said bag extending into said basket and having its opening edge portion overlying said basket about said basket opening.

3. The liquid filter of claim 1 wherein said housing lip is of annular form.

4. A liquid filter bag comprising a reticulated liquid pervious part and a liquid impervious flexible shaped-retaining edge portion connected to said reticulated part and defining an opening into said bag, and said edge portion including an annular inverted V-shaped portion terminating in an annular upturned lip part, at least part of said lip part extending at an acute angle relative to said V-shaped part.

5. A liquid filter comprising a housing defining a chamber therein, said housing having an upper opening into its chamber a top spanning said housing opening, said housing including an annular support extending about the housing within said chamber, inlet and outlet ports located in liquid flow communication through said annular support, a filter bag for filtering liquid having an opening defined by a flexible shape-retaining edge portion, said bag opening edge portion being liquid impervious and having an annular V-shaped part terminating in an annular upturned lip part, said housing including a lip spacedly located above said support, said bag fitted within said chamber and having its lip part located between said housing support and housing lip, said lip part being directly connected to said V-shaped part.

6. A liquid filter bag comprising a reticulated liquid pervious part and a liquid impervious flexible shape-retaining edge portion connected to said reticulated part and defining an opening into said bag, said edge portion including an annular inverted V-shaped portion terminating in an annular upturned lip part, said lip part being directly connected to said V-shaped portion.

* * * * *